(12) United States Patent
Chiao et al.

(10) Patent No.: US 6,760,486 B1
(45) Date of Patent: Jul. 6, 2004

(54) FLASH ARTIFACT SUPPRESSION IN TWO-DIMENSIONAL ULTRASOUND IMAGING

(75) Inventors: Richard Yung Chiao, Clifton Park, NY (US); Gregory Ray Bashford, Menomonee Falls, WI (US); Mark Peter Feilen, New Berlin, WI (US); Cynthia Andrews Owen, Memphis, TN (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 09/535,823

(22) Filed: Mar. 28, 2000

(51) Int. Cl.[7] .............................. G06K 9/40; G06K 9/00
(52) U.S. Cl. ...................... 382/274; 382/128; 382/264
(58) Field of Search ........................ 382/100, 128–134, 382/236, 294, 260–265; 345/505, 6; 378/37; 435/7.4, 7.1; 600/407, 437, 443, 446, 459

(56) References Cited

U.S. PATENT DOCUMENTS

| | | | | |
|---|---|---|---|---|
| 5,079,698 A | * | 1/1992 | Grenier et al. ............... | 382/128 |
| 5,152,292 A | * | 10/1992 | Karp ........................... | 600/454 |
| 5,212,667 A | * | 5/1993 | Tomlinson et al. ............ | 367/7 |
| 5,409,007 A | | 4/1995 | Saunders et al. | |
| 5,413,105 A | * | 5/1995 | Forestieri ..................... | 600/441 |
| 5,463,593 A | * | 10/1995 | Zanelli et al. ................ | 367/13 |
| 5,477,858 A | * | 12/1995 | Norris et al. ................ | 600/441 |
| 5,645,066 A | * | 7/1997 | Gandini et al. ............. | 600/443 |
| 5,720,291 A | * | 2/1998 | Schwartz .................... | 600/456 |
| 5,782,769 A | * | 7/1998 | Hwang et al. .............. | 600/454 |
| 6,210,334 B1 | * | 4/2001 | Phillips ....................... | 600/453 |

FOREIGN PATENT DOCUMENTS

EP    0 871 043    10/1998

* cited by examiner

*Primary Examiner*—Jayanti K. Patel
(74) *Attorney, Agent, or Firm*—Jean K. Testa; Patrick K. Patnode (57) ABSTRACT

Flash artifacts in ultrasound flow images are suppressed to achieve enhanced flow discrimination. Flash artifacts typically occur as regions of elevated signal strength (brightness or equivalent color) within an image. A flash suppression algorithm includes the steps of estimating the flash within an image and then suppressing the estimated flash. The mechanism for flash suppression is spatial filtering. An extension of this basic method uses information from adjacent frames to estimate the flash and/or to smooth the resulting image sequence. Temporal information from adjacent frames is used as an adjunct to improve performance.

18 Claims, 4 Drawing Sheets

FLASH ARTIFACT SUPPRESSION IN TWO-DIMENSIONAL ULTRASOUND IMAGING

FIELD OF THE INVENTION

This invention relates to ultrasound imaging systems and, more particularly, to methods and apparatus for imaging moving fluid and tissue.

BACKGROUND OF THE INVENTION

Color Doppler, power Doppler and B-mode flow imaging are methods currently used to image blood flow. In each method, the flow signal is isolated from the larger tissue signal by a temporal high-pass filter which blocks out echoes from stationary or slowly moving reflectors. However, flash artifacts (also referred to as 'flash') occur as a result of tissue and/or transducer motion that obscures the desired flow signals.

Previous methods for ultrasound flash suppression involve one-dimensional processing along time (see, e.g., U.S. Pat. No. 5,782,769, issued Jul. 21, 1998) whereupon an abrupt change in flow brightness at a given spatial location is assumed to be an artifact and is suppressed. However, certain blood flow phenomena have similar temporal characteristics such that suppressing flash without suppressing the flow signal is difficult if not impossible. These prior art methods often include spatial smoothing as an adjunct to improve performance, but the primary flash suppression mechanism remains temporal filtering.

SUMMARY OF THE INVENTION

In flow imaging, enhanced flow discrimination is achieved by employing a robust and efficient method of suppressing flash artifacts through real-time processing of two-dimensional image frames so as to enhance visibility of the flow signals. The processing is performed on detected image data at the back end of the ultrasound imager prior to display. Real-time image processing at the back end of the ultrasound imager has become practical with the advent of faster and cheaper CPUs (central processing units) and digital signal processors.

The preferred embodiments of the invention take advantage of the spatial characteristic of flash artifacts to estimate and suppress them more effectively and reliably. Flash artifacts typically occur as regions of elevated signal strength (brightness or equivalent color) within an image. The flash suppression algorithm in accordance with a preferred embodiment comprises the steps of estimating the flash within an image and then suppressing the estimated flash. Here, the flash suppression mechanism is spatial filtering. An extension of this basic method uses information from adjacent frames to estimate the flash and/or to smooth the resulting image sequence. Temporal information from adjacent frames is used only as an adjunct to improve performance.

DETAILED DESCRIPTION OF THE PREFERRED EMBODIMENTS

Figure 1:
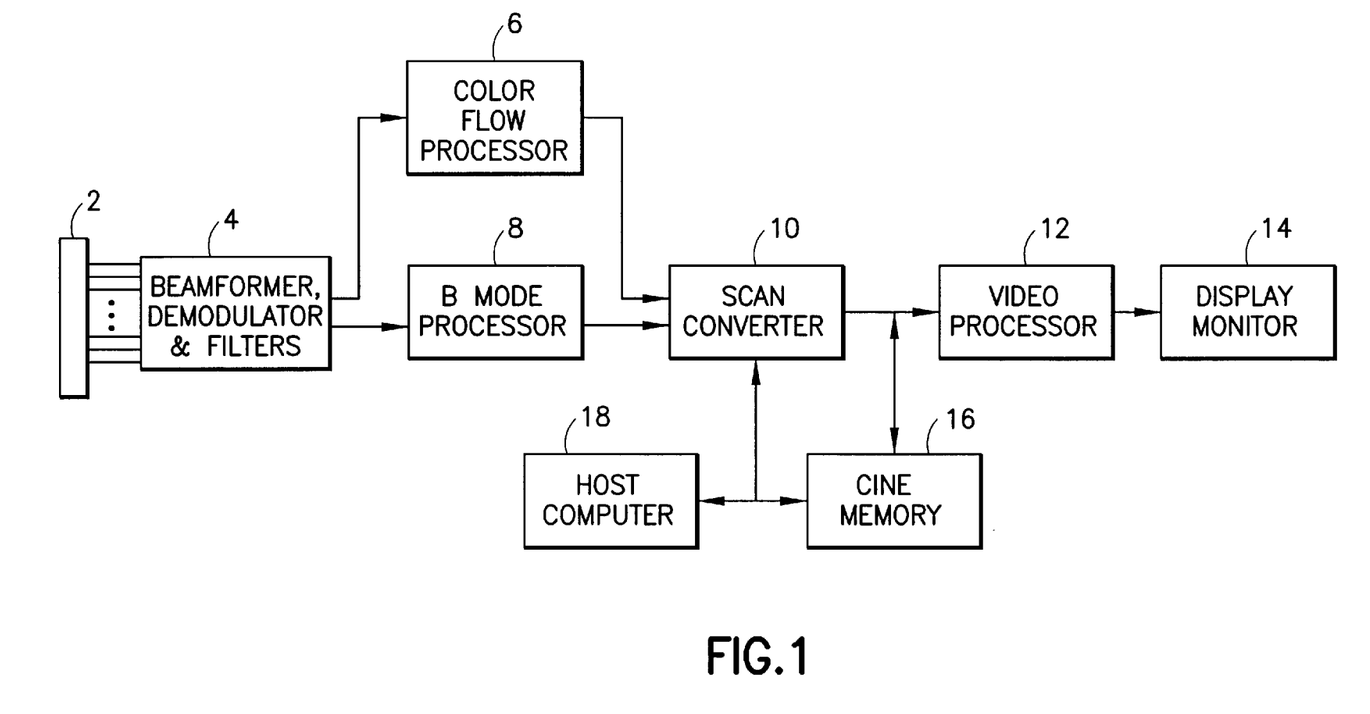
FIG. 1 is a block diagram depicting various subsystems of an ultrasound imaging system that can be programmed to incorporate a preferred embodiment of the invention.

FIG. 1 depicts an ultrasound imaging system that can be programmed to incorporate a preferred embodiment of the invention. The main data path begins with the analog RF (radio frequency) inputs to a beamformer board 4 from an array 2 of transducer elements. Beamformer board 4, which is responsible for the transmit and receive beamforming, receives as input signals low-level analog RF signals from the transducer elements. Beamformer board 4, which comprises a beamformer, a demodulator and filters, provides as output signals summed digital baseband in-phase (I) and quadrature (Q) receive beams formed from acquired data samples. These data samples are derived from ultrasound reflected from a scanned object. The I and Q data are preferably sent to FIR (finite impulse response) filters which are programmed with filter coefficients to pass a band of frequencies centered at the fundamental frequency $f_0$ of the transmit waveform or a (sub) harmonic frequency thereof.

The image data are supplied from the filters to a midprocessor subsystem, where they are processed according to the acquisition mode and produced as processed vector data. Typically, the mid-processor subsystem comprises a color flow processor 6 and a B-mode processor 8. Alternatively, a digital signal processor or array of such processors can be programmed to process signals for both modes.

B-mode processor 8 converts the baseband I and Q data from beamformer board 4 into a log-compressed version of the signal envelope. The B-mode function images the time-varying amplitude of the signal envelope as a gray scale. The envelope of a baseband signal is the magnitude of a vector represented by I and Q. The I,Q phase angle is not used in the B-mode display. The signal magnitude is the square root of the sum of the squares of the orthogonal components, i.e., $(I^2+Q^2)^{1/2}$. The B-mode intensity data are supplied to a scan converter 10. However, the preferred embodiments of the invention also have application in systems which detect the RF signal envelope without the intermediate steps of converting the RF signal to in-phase and quadrature components.

Scan converter 10 accepts the processed B-mode intensity data, interpolates where necessary, and converts the intensity data into X-Y format. The scan-converted frames are passed to a video processor 12, which maps the video data to a gray-scale mapping for video display. Conventional ultrasound imaging systems typically employ a variety of gray maps, which are simple transfer functions of the raw image data to display gray levels. The gray-scale image frames are sent to a display monitor 14 for display.

The B-mode images displayed by monitor 14 are produced from an image frame of data in which each datum indicates the intensity or brightness of a respective pixel in the display. An image frame may, e.g., comprise a 256×256 data array in which each intensity datum is an 8-bit binary number that indicates pixel brightness. Each pixel has an intensity value which is a function of the backscatter cross section of a respective sample volume in response to interrogating ultrasonic pulses and the gray map employed. The displayed image is a sector scan representing the tissue and/or blood flow in a plane through the body being imaged.

Color flow processor 6 provides a real-time two-dimensional image of blood velocity in the imaging plane. The frequency of sound waves reflecting from the inside of blood vessels, heart cavities, etc. is shifted in proportion to velocity of the blood cells: positively shifted for cells moving towards the transducer and negatively for those moving away. The blood velocity is calculated by measuring the phase shift from firing to firing at a specific range gate. Instead of measuring the Doppler spectrum at one range gate in the image, mean blood velocity from multiple vector positions and multiple range gates along each vector are calculated, and a two-dimensional image is constructed from this information. Color flow processor 6 receives the summed complex I/Q data from beamformer board 4 and processes the data to calculate the mean blood velocity, variance (representing blood turbulence) and total pre-normalization power for all sample volumes within an operator-defined region.

A primary advantage of Doppler ultrasound is that it can provide noninvasive and quantitative measurements of blood flow in vessels. Given the angle between the insonifying beam and the flow axis, the velocity vector magnitude can be determined by the standard Doppler equation:

$$v = cf_d/(2f_0 \cos \theta)$$

where c is the speed of sound in blood, $f_0$ is the transmit frequency and $f_d$ is the motion-induced Doppler frequency shift in the backscattered ultrasound signal The color flow estimates (velocity, variance and power) are sent to scan converter 10, which converts the color flow image data into X-Y format. As previously mentioned, the scan-converted frames are passed to video processor 12, which basically maps the video data to a display color map for video display, and the color flow image frames are sent to video monitor 14 for display. Typically, either velocity or power is displayed alone, or velocity is displayed in conjunction with either power or turbulence.

Figure 3:
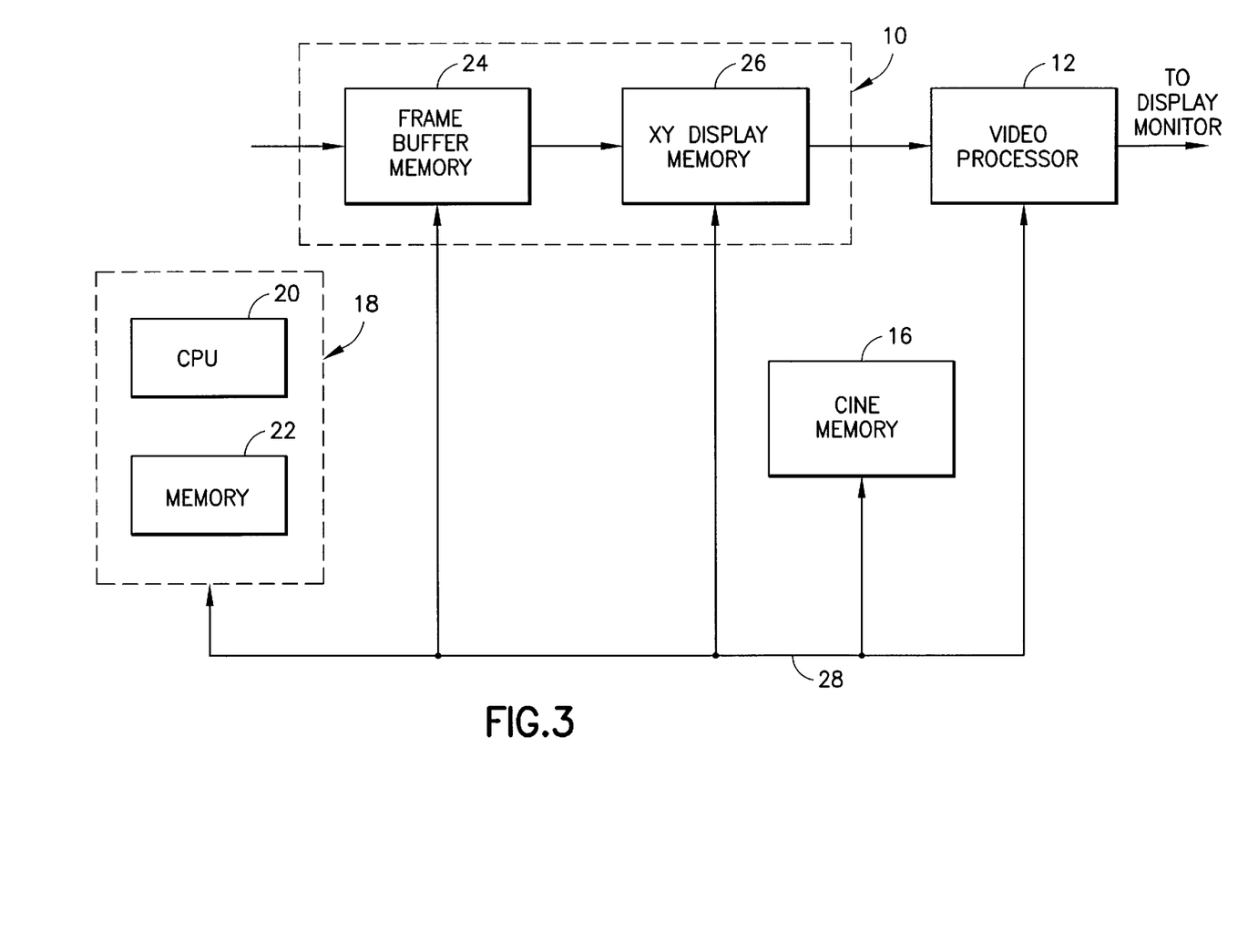
FIG. 3 is a block diagram of the back end of an ultrasound imaging system coupled to a host computer that performs a flash suppression algorithm in accordance with a preferred embodiment of the invention.

Scan converter 10 accepts processed digital data from the color flow and B-mode processors, and performs coordinate transformation of the color flow and B-mode data from polar coordinate (R–θ) sector format or Cartesian coordinate linear format to appropriately scaled Cartesian coordinate display pixel data, which are stored in an X-Y display memory 26 (see FIG. 3). Typically, color flow mode displays hundreds of adjacent sample volumes simultaneously, all laid over a black and white anatomical B-mode image and color-coded to represent velocity of each sample volume. If the image to be displayed is a combination of one B-mode frame and one color flow frame, then both frames are passed to video processor 12, which maps the B-mode data to a gray map and maps the color flow data to a color map for video display. In the final displayed image, the color pixel data are superimposed on the gray-scale pixel data.

Successive frames of color flow and/or B-mode data are stored in a cine memory 16 on a first-in, first-out basis. Storage can be continuous or in response to an external trigger event. Cine memory 16 functions like a circular image buffer that runs in the background, capturing image data that are displayed in real time to the user. When the user freezes the system by operation of an appropriate device on an operator interface (not shown), the user has the capability to view image data previously captured in cine memory.

System control is centered in a host computer or system controller 18, which accepts operator input signals through an operator interface (e.g., a control panel) and in turn controls the various subsystems. Host computer 18 performs system level control functions, accepts system status changes (e.g., mode changes), and makes appropriate system changes. A system control bus (not shown) functions as an interface between the host computer and the subsystems. A scan controller (not shown) provides real-time (acoustic vector rate) control input signals to the various subsystems. The scan controller is programmed by the host computer with the vector sequences and synchronization options for acoustic frame acquisitions. Thus the scan controller controls the beam distribution and beam density, transmitting the beam parameters defined by the host computer to the subsystems via a scan control bus (not shown).

Figure 2:
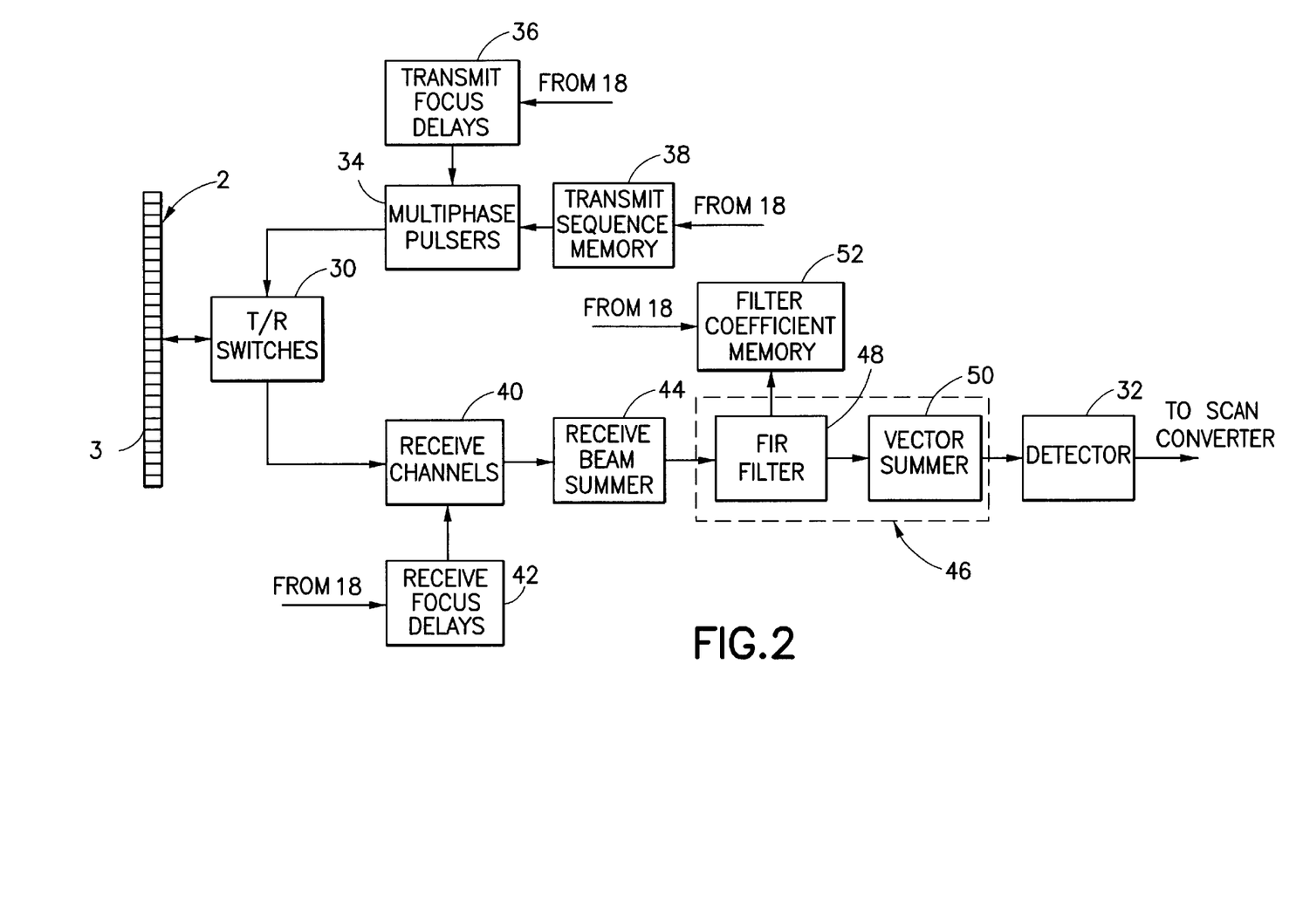
FIG. 2 is a block diagram of the front and middle portions of an ultrasound imaging system that images flow by wall filtering B-mode image data and can be programmed to incorporate a preferred embodiment of the invention.

Another ultrasonic imaging system, which performs B-mode flow imaging, is depicted in FIG. 2. Transducer elements 3 are coupled via transmit/receive switches 30 to a transmitter, when in the transmit mode, and to a receiver, when in a receive mode. The transmitter and receiver are operated under control of host computer 18 (FIG. 1) which responds to commands from a human operator via an operator interface (not shown).

The transmitter comprises a multiplicity of multiphase pulsers 34. Each transducer element 3 produces a burst of ultrasonic energy when energized by a pulsed waveform produced by a respective multiphase pulser 34. In a flow imaging mode, each transducer element in the transmit aperture is pulsed N times (where N is preferably 6 or less) using the same coded waveform. Each transmitted waveform is coded by supplying the same transmit sequence from a memory 38 into each of pulsers 34. Pulsers 34 drive elements 3 of transducer array 2 such that the ultrasonic energy produced is directed or steered in a beam for each transmit firing. To accomplish this, transmit focus time delays 36 are imparted to the respective pulsed waveforms produced by the pulsers. By appropriately adjusting the transmit focus time delays in a conventional manner, the ultrasonic beam can be focused at a desired transmit focal position. The N pulses are transmitted to the transmit focal position with a specified pulse repetition interval (PRI). The transmit sequences are supplied to memory 38 by host computer 18 based on system programming and operator input commands.

In the flow imaging system of FIG. 2, the coded waveform is derived by modulating a specially designed code sequence based on a transmit burst (base sequence) of length P. A coded pulse sequence of n bursts is referred to herein as an n-chip code. The resulting coded pulse sequence, which has a length n×P, enables use of a larger acoustic dosage or a shorter base sequence to interrogate the flowing blood. Preferred single-transmit codes include Barker codes and non-Barker codes such as the length-8 code [1,1,1,–1,1,–1,–1,1].

After each transmit firing, echo signals are transduced by transducer elements 3 into analog electrical signals, which are switched to the receiver by T/R switches 30. The receiver comprises a multiplicity of receive channels 40 and a receive beam summer 44. Under direction of host computer 18 (FIG. 1), the receiver tracks the direction of the transmitted beam. The proper receive focus time delays 42 are imparted to the received echo signals in receive channels 40, which also convert the respective analog echo signals to digital signals.

The time-delayed receive signals are summed in receive summer 44 for each of the N transmit firings focused at a particular transmit focal position.

In the flow imaging system of FIG. 2, each beamsummed receive signal is supplied to a decoding (i.e., compression) filter 46. Decoding filter 46 produces a compressed signal pulse of length equal or close to the original transmit burst length P, but whose amplitude is that produced by the n-times-longer coded pulse sequence. This coding technique has no adverse effect on frame rate and has much less chance of improper decoding due to high velocities or adaptive rotation. The coded waveform is transmitted and then the received waveform is convolved with the decoding filter impulse response to compress the waveform energy into a small time interval. The decoding filter may be a matched filter (wherein the filter coefficients are the same as the transmit code) or a mismatched filter. The mismatched filter is designed to minimize the sum of squares error between the filter output signal (with the code sequence as the input signal) and a Kronecker delta function.

Preferably, filter 46 performs the functions of decoding, bandpass filtering and wall filtering. This is accomplished by proper selection of the filter coefficients by the host computer based on system programming and operator input commands. Filter 46 filters across the N transmit firings and supplies a filtered signal to a detector 32 which forms the envelope of the firing-to-firing filtered signal. After post-processing (including edge enhancement and logarithmic compression) and scan conversion, a scan line is displayed on display monitor 14 (see FIG. 1). This procedure is repeated so that a respective scan line is displayed for each transmit focal position (in the instance of one transmit focal position for each beam angle) or for each vector (in the instance of multiple transmit focal positions for each beam angle).

Filter 46 preferably comprises an FIR filter 48 having an input coupled to the output of receive summer 44, and a vector summer 50 having an input coupled to FIR filter 48 and an output coupled to a detector 32. The FIR filter has M taps for receipt of a respective set of M filter coefficients for each transmit firing. The filter coefficients are supplied to filter 48 for each transmit firing by the host computer from a filter coefficient memory 52. The filter coefficients for the n-th transmit firing are $a_n c_1, a_n c_2, \ldots, a_n c_M$, where $a_n$ is the scalar weighting for the n-th transmit firing, n=1, 2, ..., N, and $c_1, c_2, \ldots, c_M$ is a set of filter coefficients selected so that FIR filter 48 both compresses the receive pulses and passes a major fraction of the desired fundamental frequency band. In particular, the filter coefficients $c_1, c_2, \ldots, c_M$ are obtained by convolving a first set of filter coefficients $b_1, b_2, \ldots, b_P$, which are a function of the frequency band to be passed, with a second set of filter coefficients $d_1, d_2, \ldots, d_Q$, which are either matched or mismatched filter coefficients, where M=P+Q−1. The scalar weightings $a_1, a_2, \ldots, a_N$ form a "wall" filter in slow time which selectively passes signals from reflectors moving at a velocity greater than a predetermined threshold, i.e., the slow-time filter coefficients are chosen to reject low frequencies which correspond to motion at lower speeds. The successive FIR filter output signals for the N transmit firings are coherently accumulated in vector summer 50. This is equivalent to a wall filter with a single output sample. The output signal of the vector summer undergoes envelope detection, post-processing, scan conversion and display in a known manner.

In the flow imaging system of FIG. 2, the flow image may be displayed by itself for maximum flow contrast, or may be summed with a B-mode background image. Superimposition of the flow image on a conventional B-mode image allows the diagnostician to observe the flow of blood relative to known anatomical landmarks during medical diagnosis. The flash artifact seen in this summation of flow and B-mode images is more benign than that found in conventional color-flow imaging.

In accordance with an alternative flow imaging technique, SNR (signal-to-noise ratio) is improved using two-transmit coded excitation, e.g., Golay code pairs. In particular, the SNR is improved by transmitting a pair of Golay-encoded base sequences consecutively on each beam at the same focal position and then decoding the beamsummed data.

In the flow imaging system of FIG. 2, the decoding filter, bandpass filter and wall filter are combined in an FIR filter dynamically supplied with appropriate filter coefficients and a vector summer. However, it will be readily appreciated by persons skilled in the art that separate filters could be used instead. For example, the decoding filter and bandpass filter can be combined in an FIR filter while the wall filter is separate.

The systems presented in FIGS. 1 and 2 are examples of flow imaging systems that can employ the flash suppression technique disclosed herein. However, it should be appreciated that the invention can be employed in the back end of any type of flow imaging system. Preferably, the flash suppression algorithm disclosed herein is implemented in the back-end hardware, an example of which is shown in FIG. 3.

In FIG. 3, scan converter 10 comprises a frame buffer memory 24 and an XY display memory 26. Each frame of acquired flow imaging data is stored in succession in frame buffer memory. Preferably, the frame buffer memory holds a series of image frames in a sequence of buffers arranged on a first-in, first-out basis. The flow imaging data stored in, e.g., polar coordinate (R−θ) sector format or linear format, in frame buffer memory 24 are transformed to appropriately scaled Cartesian coordinate imaging data, which are stored in XY display memory 26. Each image frame out of XY display memory 26 is sent to video processor 12. Before gray or color mapping, frames of flow imaging data in video processor 12 are stored in cine memory 16 on a first-in, first-out basis. Storage can be continuous or as a result of an external trigger event. Cine memory 16 functions similar to a circular image buffer that runs in the background, capturing image data that are displayed in real time to the user. When the user freezes the system (by operation of an appropriate device on the operator interface), the user has the capability to view image data previously captured in cine memory.

In accordance with a preferred embodiment of the invention, each image frame stored in frame display memory 26 is transferred in succession to host computer 18 for flash suppression filtering. Each flash-suppressed image frame is then returned to frame buffer memory 24 for scan conversion, video processing and display, as previously described. Alternatively, flash suppression can be performed after scan conversion, in which case the image frames are retrieved by the host computer from XY display memory 26. In accordance with a further alternative, flash suppression can be performed on a sequence of images stored in cine memory 16.

Host computer 18 comprises a central processing unit (CPU) 20 and system memory 22. CPU 20 is programmed to perform a flash suppression algorithm in accordance with a preferred embodiment of the invention. CPU 20 controls the flow of data between XY display memory 26, video processor 12, cine memory 16 and the CPU itself, via a system control bus 28. Each frame of flow imaging data, representing one of a multiplicity of scans or slices through the object being examined, is stored sequentially in frame buffer memory 24, in XY memory 26 and in video processor 12. Before mapping, frames of flow imaging data are sent from video processor 12 to cine memory 16.

In accordance with a preferred embodiment of the invention, the flash suppression algorithm comprises the steps of: estimating the flash within an image frame; suppressing the estimated flash in that image frame to produce an enhanced image frame; and then displaying the enhanced image frame.

In the first step, the flash within an image frame is estimated by computing the local mean (or median or mode) brightness image. The local mean brightness image is obtained from the original image by spatial low-pass filtering with a given two-dimensional kernel. The kernel shape is chosen to be similar to that of the typical flash, while the area of the kernel is selected to be smaller than that of the typical flash. The kernel amplitude may be uniform or tapered at the edges. The sum of the kernel elements is normalized to be unity or, for faster operation, the resulting flash estimate image is divided by the sum of the kernel elements.

The second step in this preferred embodiment is suppression of the flash estimated by the local mean brightness obtained in the first step. The flash suppression is implemented by multiplying the original image pixel by pixel, by a flash suppression mask given by a/(a+b), where a is a scalar equal to the mean brightness of the entire image frame and b is the local mean brightness image. If, at a given pixel, the local mean brightness is much larger than the overall mean brightness, then it is assumed that the given pixel represents flash and the flash suppression mask takes on a small value to suppress that given pixel. On the other hand, if the local mean brightness is much smaller than the overall mean brightness, then the flash suppression mask takes on a value close to unity to retain the original pixel brightness.

The flash-suppressed images are scaled to a given standard deviation and centered at a given mean for display with proper contrast and brightness. Any image points below/above the minimum/maximum display ranges, respectively, are clamped respectively to the minimum/maximum value. Finally, the images are smoothed in time by a length N mean or median filter.

The foregoing steps are repeated by the host computer (or a dedicated processor) of the imaging system for each image frame to suppress flash artifacts in a sequence of images. For color data, the flash suppression algorithm may operate on each component of the RGB (red, green, blue) data or select components of the HSV data. The processing may be performed in real-time with output frame delay, or may be performed on a stored image sequence (e.g., image frames stored in cine memory) . The flash processing may be performed before or after scan conversion.

In accordance with an alternative preferred embodiment, additional information from adjacent frames is used to estimate the flash. The flash is estimated using:

$$b'=b+(\Delta b_1 + \Delta b_2)/2$$

instead of b, where $\Delta b_1$ is the absolute difference of the local mean brightness of the present and previous frames, and $\Delta b_2$ is the absolute difference of the local mean brightness of the present and subsequent frames. Other variations on this theme are obviously possible. However, these variations involving multiple frames are subject to estimation errors from frame misalignment due to motion.

Another variation of the preferred embodiment is to automatically adapt the kernel shape and size as a function of the shape and size, respectively, of the flash artifacts.

Figure 4:
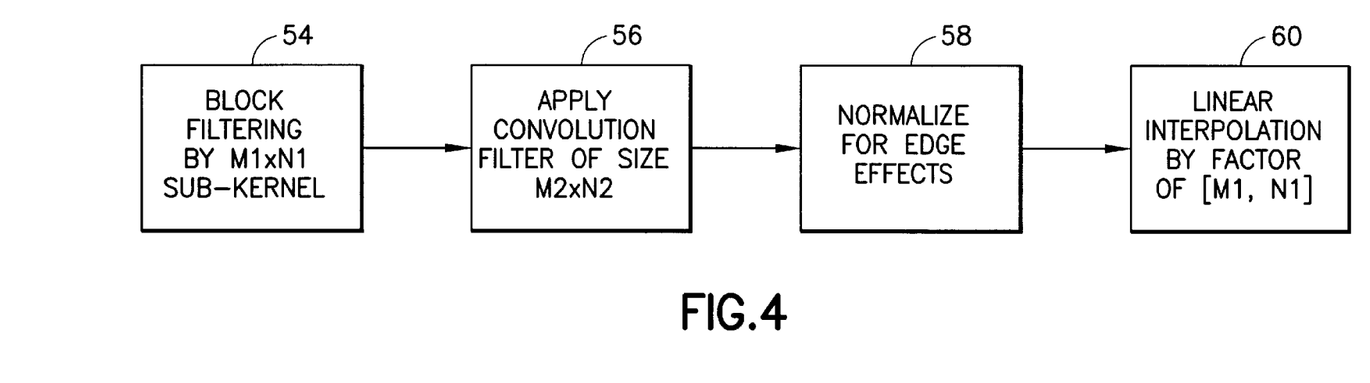
FIG. 4 is a flowchart depicting the steps of a computationally efficient method of obtaining an approximate local mean brightness image in accordance with another preferred embodiment of the invention.

Efficient computation is crucial to real-time implementation. A computationally efficient way to obtain the local mean brightness image with an M×N kernel shown in FIG. 4, comprises the steps of: applying a "block" filter of size M1×N1 to an image frame to form an image which has been sub-sampled by a factor of [M1,N1] (step 54); and applying a convolution filter of size M2×N2 to the sub-sampled image (step 56), where M=M1×M2 and N=N1×N2. Preferably, the last convolution should be properly normalized to account for edge effects (step 58). Subsequently, a useful approximation of the local mean brightness image can be obtained by linearly interpolating (step 60) the result back up by a factor of [M1×N1]. Furthermore, by selecting a separable kernel, the two-dimensional filtering step can be reduced to a number of one-dimensional filtering steps.

Figure 5:
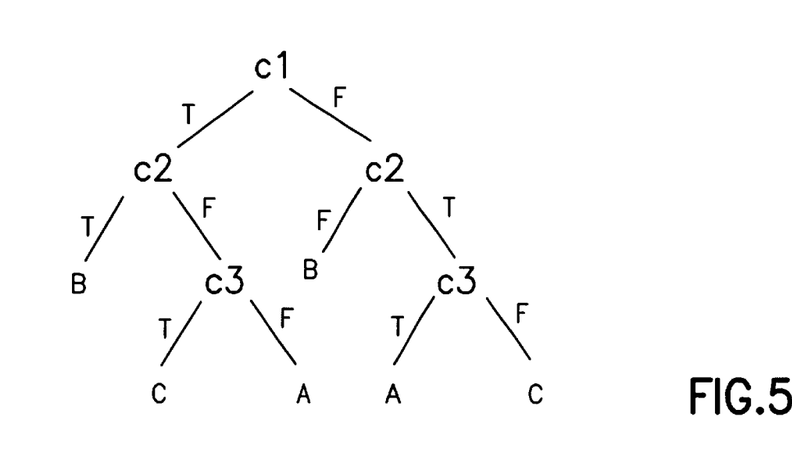
FIG. 5 is a diagram of a binary tree representing a computationally efficient method for median filtering adjacent frames of imaging data in accordance with a further preferred embodiment of the invention.

As previously disclosed, the final step involves smoothing the images in time using a length N mean or median filter. An efficient algorithm for filtering a sequence of images using a length 3 median filter is illustrated in FIG. 5. To compute the median filter output signal for a given frame B, three logical arrays c1, c2, and c3 are computed by forming the relationships A>B, B>C, and A>C on a pixel-by-pixel basis, where A and C are adjacent frames. Given these three binary arrays, the output signal is given by the binary tree shown in FIG. 5. If the particular relationship (c1, c2 or c3) of pixel values for two frames is true, then the decision path follows the line labeled T in FIG. 5; if the relationship of pixel values for the two frames is false, then the decision path follows the line labeled F. The binary tree depicted in FIG. 5 can be expressed by two binary relationships as follows:

Select $A$: $c1\overline{c2}\overline{c3}|\overline{c1}c2c3$

Select $C$: $\overline{c1}c2c3|c1\overline{c2}c3$

Computational efficiency arises for the following reasons: a) batch processing of the data; b) the logical comparison is fast to compute; and c) only two new logical arrays (c2 and c3) need to be computed for each successive frame since the new c1 array is just the old c2 array.

While only certain preferred features of the invention have been illustrated and described, many modifications and changes will occur to those skilled in the art. For example, instead of filtering using the host computer, dedicated digital signal processors can be used to suppress flashes in imaging data. It is, therefore, to be understood that the appended claims are intended to cover all such modifications and changes as fall within the true spirit of the invention.

What is claimed is:

1. A method for suppressing flash in an image, comprising the steps of:

estimating the flash within a first image frame, wherein said step of estimating the flash within a first image frame comprises the step of computing a local mean (or mean or mode) brightness image, wherein said local mean brightness image is obtained from said first image frame by spatial low-pass filtering with a predetermined two-dimensional kernel, said predetermined two-dimensional kernel has dimensions M×N and said spatial low-pass filtering comprises the steps of:

applying a block filter (54) of size M1×N1 to said first image frame to form an image which has been sub-sampled by a factor of [M1, N1];

applying a convolution filter of size M2×N2 to said sub-sampled image, where M=M1×M2 and N=N1×N2; and linearly interpolating said convolution-filtered sub-sampled image by a factor of [M1, N1];

suppressing the estimated flash in said first image frame to produce a first enhanced image frame; and displaying an image frame derived from said first enhanced image frame.

2. The method as recited in claim 1, wherein a shape of said kernel is similar to a shape of a typical flash.

3. The method as recited in claim 1, wherein an area of said kernel is less than an area of a typical flash.

4. The method as recited in claim 1, wherein said estimated flash is suppressed by pixel-by-pixel multiplying of said first image frame by a flash suppression mask given by a/(a+b), where a is a scalar equal to the mean bright-ness of said image and b is said local mean brightness image.

5. The method as recited in claim 1, wherein said first enhanced image frame is scaled to a given standard deviation.

6. The method as recited in claim 1, wherein said convolution filter is properly normalized (58) to account for edge effects.

7. The method as recited in claim 1, wherein said predetermined two-dimensional kernel is separable, and said convolution filtering step comprises a plurality of one-dimensional convolutions.

8. The method as recited in claim 1, wherein said step of estimating the flash within said first image frame comprises the step of computing an absolute difference of a local mean brightness image of said first image frame and a local mean brightness image of a second image frame adjacent to said first image frame.

9. A method for suppressing flash in an image, comprising the steps of:

estimating the flash within a first image frame;

suppressing the estimated flash in said first image frame to produce a first enhanced image frame;

estimating the flash within a second image frame;

suppressing the estimated flash in said second image frame to produce a second enhanced image frame;

temporally filtering at least said first and second enhanced image frames to form a temporal filter output image frame, said temporal filtering step comprises the step of applying a median filter, and said step of applying a median filter comprises the steps of:

computing first, second and third logical arrays c1, c2, and c3 by forming the relationships A>B, B>C, and A>C on a pixel-by-pixel basis, where, A, B, and C are successive image frames; and computing said temporal filter output image frame for frame B using the following binary relationships:

Select A: $c1\overline{c2}\overline{c3}|\overline{c1}c2c3$

Select C: $\overline{c1}c2c3|c1\overline{c2}\overline{c3}$;

and displaying an image frame derived from said temporal filter output image frame.

10. A system for displaying imaging data, comprising:

memory for storing frames of imaging data;

a display subsystem for displaying an image derived from one or more frames stored in said memory; and a processor programmed to perform the following steps:

(a) estimating the flash within a first image frame retrieved from said memory, wherein said step of estimating the flash within a first image frame comprises the step of computing a local mean (or mean or mode) brightness image, and wherein said estimated flash is suppressed by pixel-by-pixel multiplying of said image frame by a flash suppression mask given by a/(a+b), where a is a scalar equal to the mean brightness of said image and b is said local mean brightness image;

(b) suppressing the estimated flash in said first image frame to produce a first enhanced image frame; and (c) sending an image frame derived from said first enhanced image frame to said display subsystem for display.

11. The system as recited in claim 10, wherein said local mean brightness image is obtained from said first image frame by spatial low-pass filtering with a predetermined two-dimensional kernel.

12. The system as recited in claim 11, wherein said predetermined two-dimensional kernel has dimensions M×N and said spatial low-pass filtering comprises the steps of:

applying a block filter of size M1×N1 to said first image frame to form an image which has been sub-sampled by a factor of [M1, N1];

applying a convolution filter of size M2×N2 to said sub-sampled image, where M=M1×M2 and N=×N2; and linearly interpolating) said convolution-filtered sub-sampled image by a factor of [M1, N1].

13. The system as recited in claim 12, wherein said convolution filter is properly normalized (58) to account for edge effects.

14. The system as recited in claim 12, wherein said predetermined two-dimensional kernel is separable, and said convolution filtering step comprises a plurality of one-dimensional convolutions.

15. The system as recited in claim 10, wherein said stop of estimating the flash within said first image frame comprises the step of computing an absolute difference of a local mean brightness image of said first image frame and a local mean brightness image of a second image frame adjacent to said first image frame.

16. A system for displaying imaging data, comprising:

memory for stoning frames of imaging data;

a display subsystem for displaying an image derived from frames stored in said memory; and a processor programmed to perform the following steps:

(a) estimating the flash within a first image frame retrieved from said memory;

(b) suppressing the estimated flash in said first image frame to produce a first enhanced image frame; and (c) estimating the flash within a second image frame retrieved from said memory;

(d) suppressing the estimated flash in said second image frame to produce a second enhanced image frame;

(e) temporally filtering said first and second enhanced image frames to produce a temporal filter output image frame, wherein said step of temporal filtering comprises the steps of:

computing first, second and third logical arrays c1, c2, and c3 by forming the relationships A>B, B>C, and A>C on a pixel-by-pixel basis, where A, B, and C are successive image frames; and computing said temporal filter output image frame for frame B using the following binary relationships:

Select A: $c1\overline{c2}c\overline{3}|\overline{c1}c2c3$

Select C: $\overline{c1}c2c\overline{3}|c1\overline{c2}c3$;

and (f) sending an image frame derived from said temporal filter output image frame to said display subsystem for display.

17. An imaging system comprising:

a scanning subsystem for scanning an object;

a data acquisition subsystem for acquiring frames of imaging data in response to said scanning;

a display subsystem for displaying an image derived from one or more acquired frames; and a processor coupled to receive acquired frames of imaging data from said data acquisition system, said processor being programmed to perform the following steps:

(a) estimating the flash within an acquired frame of imaging data, said step of estimating the flash within an acquired frame comprises the step of computing a local mean (or mean or mode) brightness image and wherein said estimated flash is suppressed by pixel-by-pixel multiplying of said acquired frame by a flash suppression mask given by a/(a+b), where a is a scalar equal to the mean brightness of said image and b is said local mean brightness image;

(b) suppressing the estimated flash in said acquired frame to produce an enhanced image frame; and (c) sending an image frame derived from said enhanced image frame to said display subsystem for display.

18. The imaging system as recited in claim 17, wherein said local mean brightness image is obtained from said acquired frame by spatial low-pass filtering with a predetermined two-dimensional kernel.

* * * * *